United States Patent [19]
Niemiro et al.

[11] Patent Number: 5,694,974
[45] Date of Patent: Dec. 9, 1997

[54] FLUID LEVEL DETECTION SYSTEM FOR INK IN A PRINTING PRESS

[75] Inventors: Thaddeus A. Niemiro, Lisle; Frederick J. Whiting, LaGrange; John W. Manser, Elgin; Joseph Vucko, Lemont; Frank R. Czajka, Mt. Prospect, all of Ill.

[73] Assignee: Goss Graphic Systems, Inc., Westmont, Ill.

[21] Appl. No.: 590,989

[22] Filed: Jan. 24, 1996

[51] Int. Cl.⁶ .................. F16K 21/18; F16K 31/02; F16K 37/00

[52] U.S. Cl. .................. 137/392; 73/304 R; 137/358; 101/350; 340/620

[58] Field of Search .................. 101/350, 364, 101/365, 367, 207, 208, 210, 148; 137/558, 386, 392, 554; 340/619, 620; 73/301, 304 R, 304 C

[56] References Cited

U.S. PATENT DOCUMENTS

| | | | |
|---|---|---|---|
| 2,762,390 | 9/1956 | Rodenacker | 137/386 |
| 3,311,834 | 3/1967 | Barker | 137/392 |
| 3,580,158 | 5/1971 | Scholle et al. | 137/392 |
| 3,835,881 | 9/1974 | Dal et al. | 137/392 |
| 4,329,923 | 5/1982 | Iida | 101/365 |
| 4,445,238 | 5/1984 | Maxhimer | 137/392 |
| 4,737,801 | 4/1988 | Ichihashi et al. | 137/392 |
| 4,841,321 | 6/1989 | Kose et al. | 137/392 |
| 4,852,604 | 8/1989 | Wales et al. | 137/392 |
| 5,105,739 | 4/1992 | Osawa et al. | 101/365 |
| 5,427,136 | 6/1995 | Weishew | 137/392 |

*Primary Examiner*—George L. Walton
*Attorney, Agent, or Firm*—Marshall, O'Toole, Gerstein, Murray & Borun

[57] ABSTRACT

A fluid level detection system (50) for ink in a printing press (10) having a vessel (58) having walls (60) defining a chamber (62), an elongated rotatable shaft (64) in the chamber (62), a motor (66) for rotating the shaft (64), an elongated flexible blade (68) affixed to the shaft 64 such that the motor (66) rotates the blade (68), and a proximity sensor (72) adjacent the walls (60) of the vessel (58) to detect the rotating blade (68) in the absence of ink at the level of the blade (68), with the blade (68) flexing in the presence of ink such that the sensor (72) does not detect the blade (68).

11 Claims, 4 Drawing Sheets

FLUID LEVEL DETECTION SYSTEM FOR INK IN A PRINTING PRESS

BACKGROUND OF THE INVENTION

The present invention relates to fluid level detection systems for ink in a printing press.

In the past, residual ink on a roller in a printing press has been scraped from the roller, and the ink is returned to a supply of ink for the press in order to reuse the residual ink in the press. Such devices have typically used receptacles to collect the residual ink, and floatation devices in the receptacle in order to control the level of ink in the receptacles. However, such floatation devices often become clogged with the ink rendering the floatation devices useless. Also, the thixotropic properties of the ink does not allow the ink to seek its own level in a reasonable time, and it is necessary to continuously agitate the ink in order to bring the ink down to a reasonably predictable level while being able to monitor that level.

SUMMARY OF THE INVENTION

A principal feature of the invention is the provision of an improved level detection system for ink in a printing press.

The system comprises a vessel having walls defining a chamber, an elongated rotatable shaft in the chamber, means for rotating the shaft, and an elongated flexible blade affixed to the shaft such that the rotating means rotates the blade.

A feature of the present invention is the provision of a proximity sensor adjacent the walls of the vessel to detect the rotating blade.

Another feature of the invention is that the blade actuates the sensor when the level of ink in the chamber is lower than the blade in the chamber.

A further feature of the invention is that the blade flexes in the presence of ink, and does not actuate the sensor when the level of ink is at least as high as the blade.

Thus, a feature of the invention is that the blade and sensor supply a signal which determines the level of ink in the chamber.

Another feature of the invention is that the blade is constructed from a metallic material, and has an outwardly turned end.

A further feature of the invention is that the blade does not get clogged with ink during use, and thus the device of the present invention is more reliable than the previous devices.

Another feature of the invention is that the device is of simplified construction and reduced cost.

A further feature of the invention is that the device may have second flexible blade and an associated proximity sensor at a level higher than the first blade, in order to determine if the ink reaches an unacceptable level of ink in the chamber, in which case an alarm may be sounded, or the press may be automatically shut down.

Yet another feature is the provision of a rotatable wiper blade in the chamber in order to scrape the walls free of ink.

Another feature of the invention is that the shaft may extend vertically or horizontally in the chamber.

Further features will become more fully apparent in the following description of the invention, and from the appended claims.

DESCRIPTION OF THE PREFERRED EMBODIMENTS

Figure 1:
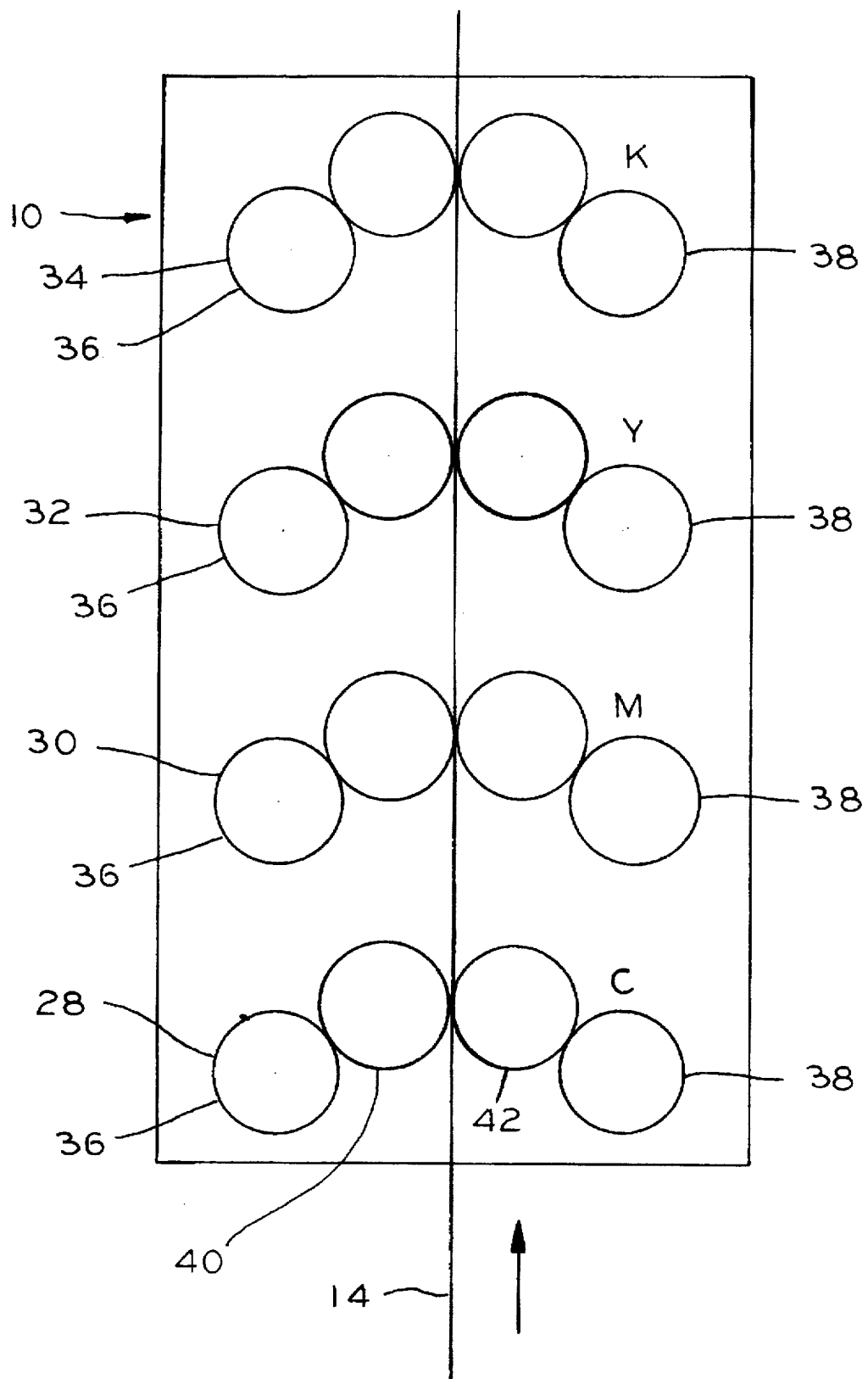
FIG. 1 is a diagrammatic view of a typical printing press.

Referring now to FIG. 1, there is shown a printing press generally designated 10 for printing an image on a paper web 14. The press 10 has a plurality of printing units 28, 30, 32, and 34 for printing different colors of ink on the web 10. As shown, the printing unit 28 may print an ink having a color Cyan C, the printing unit 30 may print an ink having a color Magenta M, the printing unit 32 may print an ink having the color Yellow Y, and the printing unit 34 may print an ink having a color black K in a four-color press 10.

The printing units 28, 30, 32, and 34 each have a plurality of print rolls or cylinders 36 associated with a blanket cylinder or roll 40. During printing by the press 10, an image of the ink is transferred from the print rolls 36 to the associated blanket rolls 40 to print the image on one surface of the web 14. In addition, the press 10 may have a plurality of printing units having a plurality of print rolls 38 associated with a plurality of blanket rolls or cylinders 42 on an opposed side of the web 14 in order to transfer the ink image from the print rolls 38 to the blanket rolls 42 for printing an image on the other surface of the web 14. The following description of the print rolls is equally applicable to either the print rolls 36 or the print rolls 38 on the opposed sides of the web 14.

Figure 2:
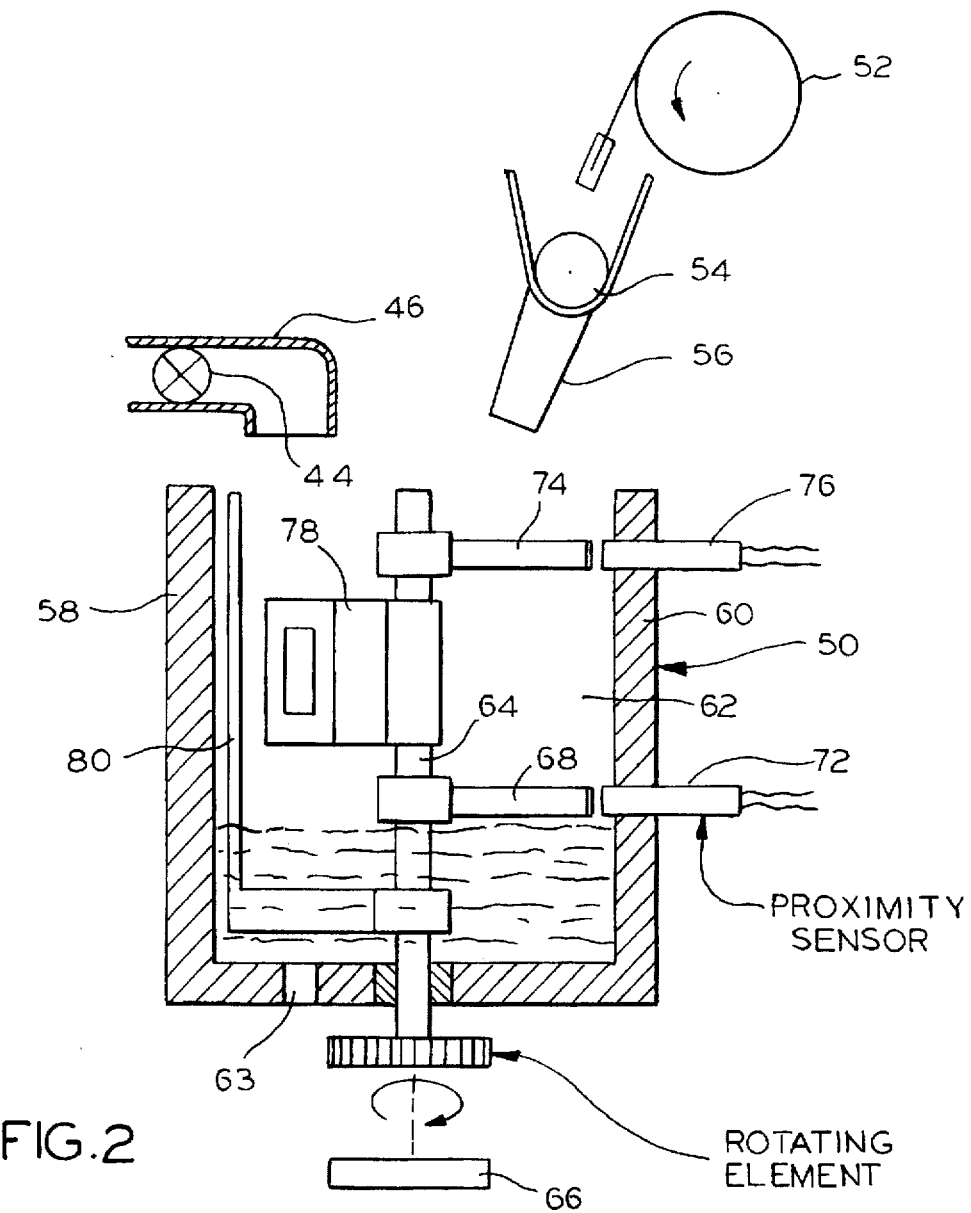
FIG. 2 is a sectional diagrammatic view of a fluid level detection system for the ink in a printing press of the present invention.
Figure 3:
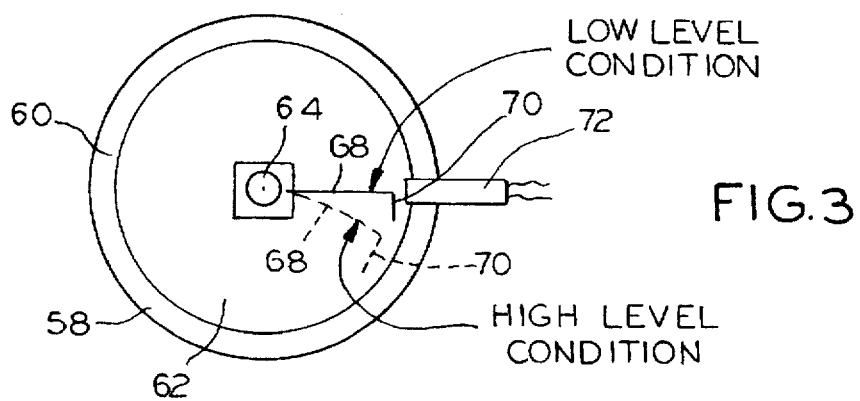
FIG. 3 is an upper diagrammatic view of the detection system of FIG. 2.
Figure 4:
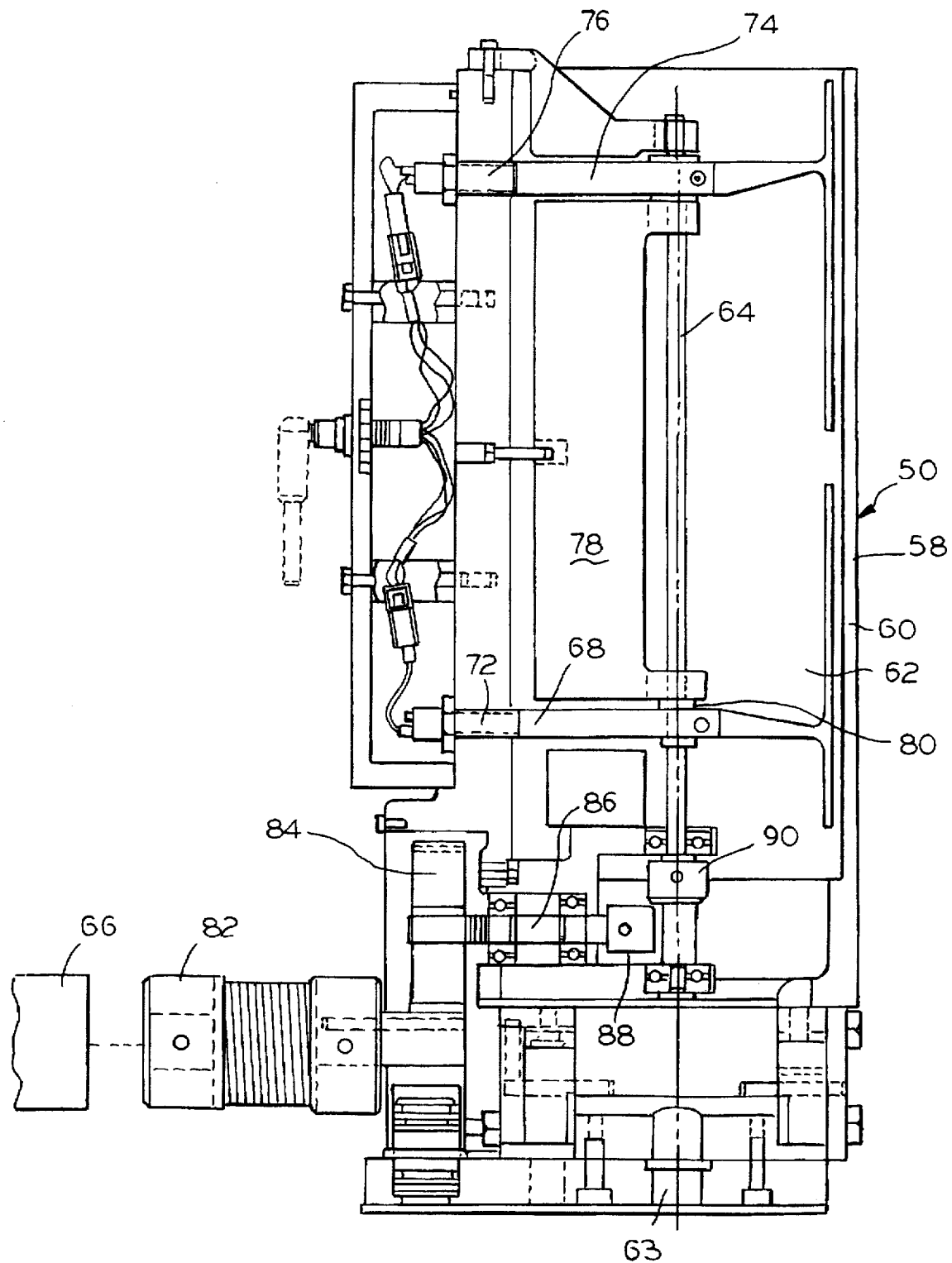
FIG. 4 is a sectional view of the detection system of the present invention.

Referring now to FIGS. 2-4, there is shown a fluid level detection system generally designated 50 for the printing press 10. The residual ink from a roller 52 is scraped from the roller 52, and passes through conveyer screw 54 into a hollow return member 56 into an upper portion of a vessel 58 in the system 50.

The vessel 58 has walls 60 defining a chamber 62 in the vessel 58. The returned residual ink collects in a lower part of the chamber 62, and passes through a port 63 where the ink is returned to a supply of ink in order to recycle the ink in the press 10.

The system 50 has a vertical rotatable shaft 64 in the chamber 62, which is driven by a suitable motor 66. The system 50 has an elongated first lower blade 68 constructed from a flexible metallic material. The blade 68 is affixed to the shaft 64 in order to rotate the blade 68 in the chamber 62. The blade 68 also has an outwardly turned end 70 adjacent the walls 60 of the vessel 58. The system 50 also has a first lower proximity sensor 72 which detects presence of the turned end 70 of the first blade 68, and sends a signal to the control system in order to control the new ink supply valve 44. The new ink supply valve 44 adds ink to the system 50 through a supply manifold 46 intermittently according to the system demand.

As shown in FIG. 3, when the first blade 68 is unimpeded by the absence of ink, as shown by the solid lines in the drawing, the blade 68 remains straight and actuates the sensor 72 when the outwardly turned end 70 of the blade 68 is in the proximity of the sensor 72. In this condition, the ink is at a level below the level of the first blade 68, and the signal is used to open the valve 44 in order to accept additional new ink into the chamber 62. However, when the level of the ink in the chamber 62 is at least as high as the level of the blade 68, the blade 68 flexes due to the viscosity of the ink, as shown by the dashed lines in the drawing, and forms a gap between the outwardly turned end 70 of the blade 68 and the sensor 72, such that the sensor 72 does not detect the blade 68. In this condition, the system 50 actuates the valve 44 in order to prevent further supply of new ink into the chamber 62 until the level of ink in the chamber 62 falls to a level below the blade 68 at which time the valve 44 is again opened by the blade 68 and sensor 72.

As shown in FIGS. 2-4, the system 50 also have an upper flexible second blade 74 and associated second proximity sensor 76. The upper blade 74 and sensor 76 detects the presence or absence of ink at the level of the second blade 74, an operation the same as the first blade 68 and sensor 72. The upper blade 74 actuates the sensor 76 in the absence of ink at the level of the second blade 74, but the blade 74 flexes in the presence of ink such that the second sensor 76 is not actuated in this condition. Thus, when the level of ink is below the second blade 74, the system operates normally, but in the case of the ink reaching the second blade 74, the system 50 senses this condition by the sensor 76, and causes an alarm to sound or the press to be shut down since this is an undesirable condition of the system 50.

As shown in FIGS. 2 and 4, the system 50 has a fixed baffle 78 in the chamber 62. The system also has a wiper blade 80 affixed to the rotatable shaft 64 in order to rotate the wiper member 80 in the chamber 62. The wiper blade is located adjacent the walls 60 of the vessel 58 in order to clean ink from the walls 60 of the vessel 58.

In a preferred form, as shown in FIG. 4, the motor 66 drives a connecting member 82 which in turn drives a gear 84. The gear 84 is connected by a shaft 86 to an inner beveled gear 88 which is meshed with a beveled gear 90 on the shaft 64 in order to rotatably drive the shaft 64 in the chamber 62, as previously described.

Thus, in accordance with the present invention the system 50 uses a flexible blade 68 in the chamber 62 in order to control the sensor 72 and system 50 in a simplified and more reliable manner.

Figure 5:
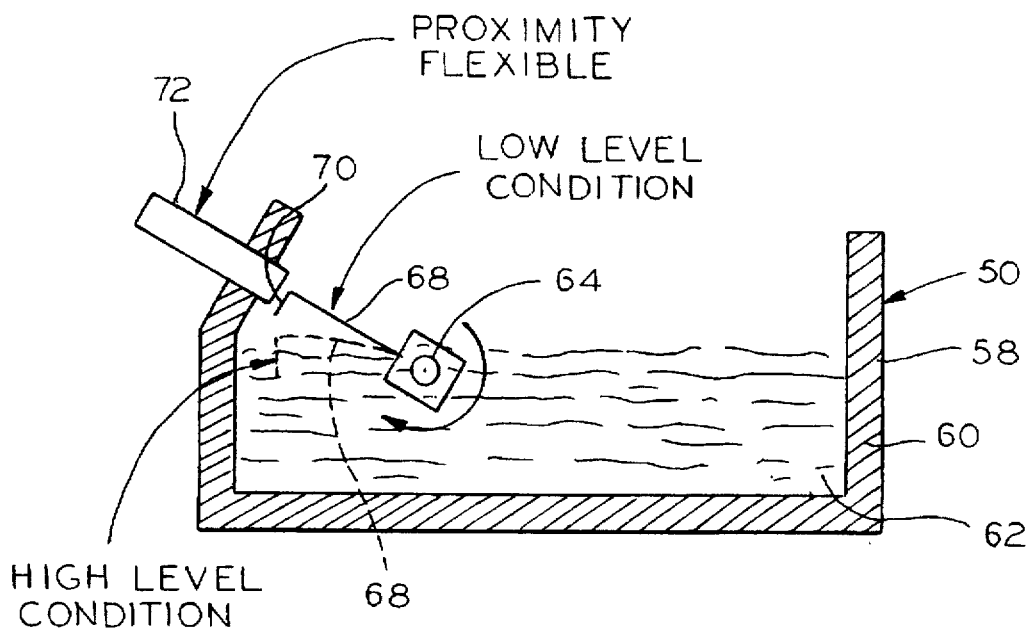
FIG. 5 is a diagrammatic sectional view of another embodiment of the fluid level detection system of the present invention.

Another embodiment of the present invention is shown in FIG. 5, in which like reference numerals designate like parts. In this embodiment, the rotatable shaft 64 is located horizontally in the chamber 62 in order to control the sensor 72 by flexing of the blade 68 in the presence of ink, as previously described. In other respects, the system 50 of FIG. 5 is similar to that previously described in connection with FIGS. 2-4.

Figure 6:
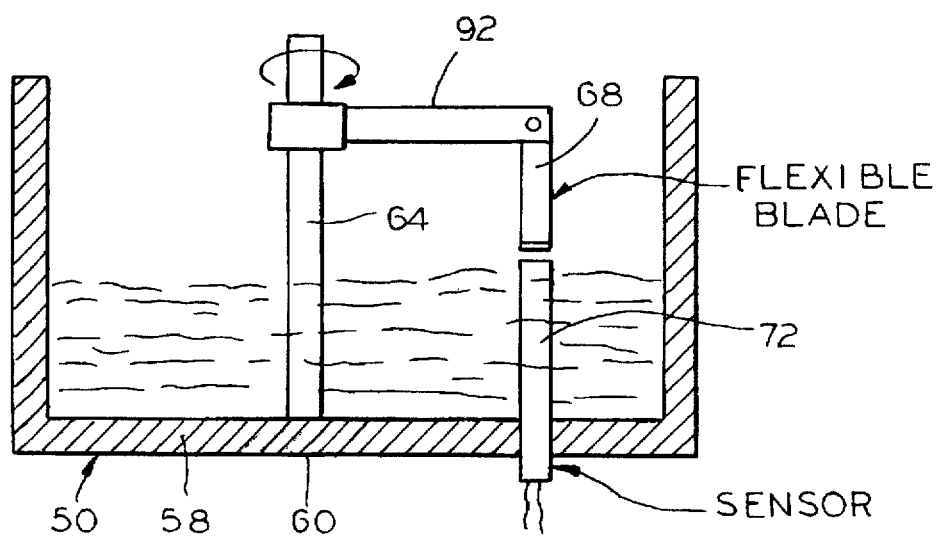
FIG. 6 is a diagrammatic view of another embodiment of the detection system of the present invention.

Another embodiment is illustrated in FIG. 6, in which like reference numerals designate like parts. In this embodiment, the sensor 72 extends a distance in the chamber 62 from a lower part of the chamber 62, and the system 50 has an arm 92 extending outwardly from the shaft 64, and flexible blade 68 extending from an outer end of the arm 92 to the locality of the sensor 72. The blade 68 flexes in the presence of ink, and operates substantially the same as the system previously described in connection with FIGS. 2-4.

The foregoing detailed description has been given for clearness of understanding only, and no unnecessary limitations should be understood therefrom, as modifications will be obvious to those skilled in the art.

What is claimed is:

1. A fluid level detection system for ink in a printing press, comprising:
    a vessel having a wall defining a chamber;
    an elongated rotatable shaft in the chamber;
    means for rotating the shaft;
    an elongated flexible blade affixed to the shaft and having an outer end remote from the shaft such that the rotating means rotates the blade to cause the outer end to rotate relative to the wall of the vessel; and
    a proximity sensor associated with the wall of the vessel to detect the rotating blade at a point along the path of travel of the outer end of the blade, the blade flexing in the presence of ink to position the outer end at a first distance from the proximity sensor where the proximity sensor cannot detect the blade, the blade being straight in the absence of ink to position the outer end at a second, closer distance from the proximity sensor where the proximity sensor detects the blade.

2. The system of claim 1 including a source of ink selectively in communication with an upper portion of the chamber.

3. The system of claim 2 including a valve operatively associated with the proximity sensor to prevent passage of ink from the source into the chamber when the outer end of the blade is at the first distance from the proximity sensor and to permit passage of ink into the chamber when the outer end of the blade is at the second, closer distance from the proximity sensor.

4. The system of claim 1 including a second flexible blade affixed to the shaft at a location spaced from and positioned above the first blade, and a second proximity sensor associated with the wall of the vessel at a point along the path of travel of the outer end of the second blade, the second blade flexing in the presence of ink to position the outer end at a first distance from the second proximity sensor where the second proximity sensor cannot detect the blade, the second blade being straight in the absence of ink to position the outer end at a second, closer distance from the second proximity sensor where the second proximity sensor detects the blade.

5. The system of claim 4 including means operatively associated with the second proximity sensor for actuating an alarm when the outer end is at the first distance from the second proximity sensor.

6. The system of claim 4 including means operatively associated with the second proximity sensor for shutting down the press when the outer end is at the first distance from the second proximity sensor.

7. The system of claim 1 including a wiper member affixed to the shaft such that the rotating means rotates the wiper member, the wiper member extending to a point adjacent the wall of the chamber to remove ink therefrom.

8. The system of claim 1 wherein the proximity sensor extends from the wall into the chamber.

9. The system of claim 1 wherein the shaft extends vertically in the chamber.

10. The system of claim 1 wherein the shaft extends horizontally in the chamber.

11. The system of claim 1 wherein the blade is metallic and includes an outwardly turned end.

* * * * *